Figure 6:
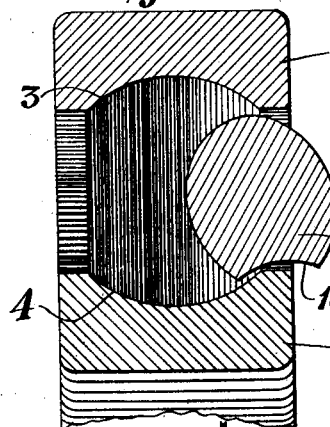

J. L. BORG.
BALL BEARING PROVIDED WITH AN ENTRANCE OPENING FOR THE BALLS.
APPLICATION FILED MAR. 5, 1919.
1,405,894.
Patented Feb. 7, 1922.
2 SHEETS—SHEET 1.
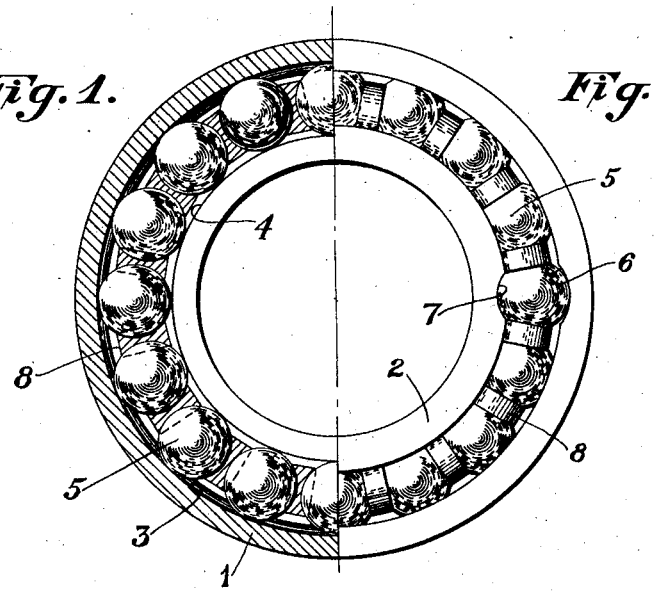
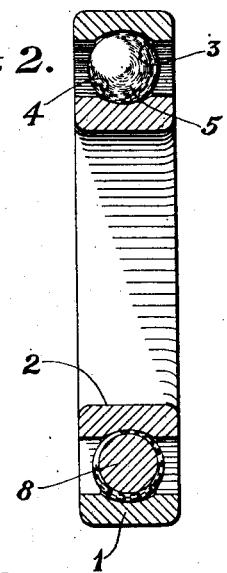
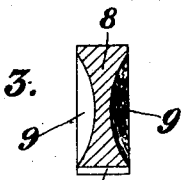
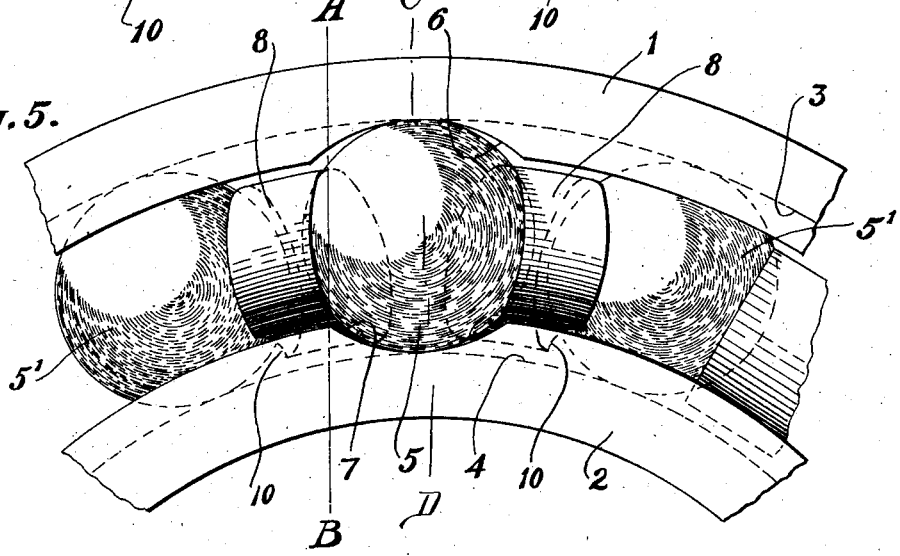
INVENTOR.
Johan Linus Borg,
BY
Fraser, Jurk & Myers
ATTORNEYS J. L. BORG.
BALL BEARING PROVIDED WITH AN ENTRANCE OPENING FOR THE BALLS.
APPLICATION FILED MAR. 5, 1919.

1,405,894.

Patented Feb. 7, 1922.
2 SHEETS—SHEET 2.

INVENTOR.
Johan Linus Borg
BY
Fraser, Durk & Myers
ATTORNEYS

UNITED STATES PATENT OFFICE.

JOHAN LINUS BORG, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BALL BEARING PROVIDED WITH AN ENTRANCE OPENING FOR THE BALLS.

1,405,894.     Specification of Letters Patent.     Patented Feb. 7, 1922.

Application filed March 5, 1919. Serial No. 280,718.

*To all whom it may concern:*

Be it known that I, JOHAN LINUS BORG, a subject of the King of Sweden, residing at Gottenborg, in the Kingdom of Sweden, have invented a new and useful Improvement in Ball Bearings Provided with an Entrance Opening for the Balls, of which the following is a specification.

The present invention relates to an improvement in ball bearings of the type which are provided in a well-known manner with an entrance opening serving for introducing the balls, or at least the last balls, and in which the balls which move in tracks in the races of the bearing, are maintained at the desired distance from one another by means of non-elastic distance pieces introduced between and partly surrounding the balls. There has previously been proposed a great number of means for rendering it possible to introduce the last ball into a bearing of the kind referred to, probably the simplest means of which consists in introducing the last ball and the two distance pieces which are to be located on either side of said ball, simultaneously into place in the bearing by the distance pieces being caused to turn, by pressure applied to the ball placed between the same, both around the said ball and around the balls previously introduced into the tracks to either side of the distance pieces. In order to render such introduction possible the distance pieces have heretofore been given an extension in radial direction smaller than the distance between the side edges of the races. As a result of said arrangement, however, the distance pieces are only capable of surrounding a very small portion of the balls, and accordingly they will easily drop out from the bearing.

The purpose of the improvement forming the subject of the present invention is to avoid the said inconvenience and to render it possible to use and to introduce distance pieces having a larger extension in radial direction than the distance between the side edges of the races and which are therefore capable of surrounding a considerable portion of the balls. The introduction of the two distance pieces which are to be placed to either side of the ball last introduced when assembling the bearing, is rendered possible according to the present invention by the said distance pieces being shaped in such manner that the introduction may be effected without interference with the edges of the entrance opening, so that the normal width of the said opening required for the introduction of the balls may be retained unaltered. This arrangement may advantageously be carried out in such manner that each of said two distance pieces is provided at a point on the free side, that is to say the side not bearing against a ball, with a notch which in a certain position of the distance piece allows the same to be turned past the edge of the entrance opening. When the bearing is in use it will hardly ever occur that both distance pieces occupy the said certain position simultaneously when the ball placed between the said distance pieces moves past the entrance opening, so that there is practically no risk of the said distance pieces and the ball escaping from the bearing, even in case the entrance opening was so deep that the ball was capable of moving freely in lateral direction in said opening without special actuation.

Figure 7:
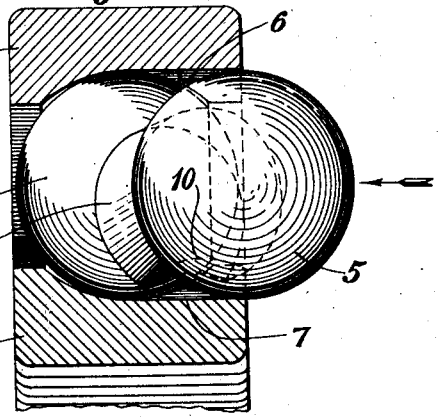
Figure 8:
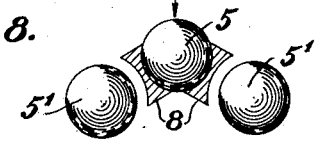
Figure 9:
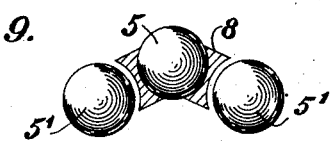
Figure 10:
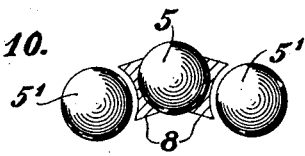
Figure 11:
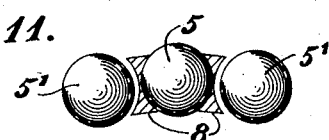
Figure 13:
Figure 14:

The accompanying drawings illustrate a few embodiments of the invention. Fig. 1 shows a side elevation partly in section of a single row ball bearing with an entrance opening and non-elastic distance pieces. Fig. 2 shows an axial section through the bearing. Fig. 3 shows a section and Fig. 4 shows a side view of one embodiment of the distance pieces. Fig. 5 shows a side view of a portion of the bearing with the last ball and the two adjacent distance pieces about to be pushed into place in the bearing. Fig. 6 shows a section of the bearing on the line A—B of Fig. 5, and Fig. 7 is a section through the races of the bearing at the entrance opening on the line C—D of Fig. 5. Figs. 8 to 12 incl. illustrate the successive positions of the last ball and of the two adjacent distance pieces when pushed into place in the bearing. Fig. 13 shows a section of a modified construction of the distance piece, of which Fig. 14 shows an edge view and Fig. 15 a side view.

The bearing shown in Figs. 1 and 2 consists in the ordinary manner of an outer race 1 and an inner race 2 which are provided with tracks 3 and 4 respectively, in which the balls 5 move. In order to render possible the introduction of the balls into the bearing the races are provided with side notches 6 and 7 respectively, which form together an entrance opening through which the balls may be introduced, the outer race being previously heated if desired. For maintaining the balls at a definite distance from one another non-elastic distance pieces 8 independent of one another are placed between the balls, said distance pieces consisting, according to the embodiment shown in Figs. 3 and 4, of round disks with cavities 9 at their opposite ends so as to cause the disks partly to embrace the balls, as will be clearly understood from Fig. 1. It will also be understood that on account of the diameter of the disks being larger than the distance between the side edges of the races, the distance pieces are prevented from dropping out of the bearing when all balls and distance pieces are properly placed between the races.

For rendering it possible to push the last ball and the two last distance pieces on either side of said ball into place in the bearing, notwithstanding the fact that said distance pieces have a larger diameter than the distance between the side edges of the races, each of the said distance pieces is provided, according to the present invention, with a notch 10 at its periphery, said notch rendering it possible to push the distance piece past the edge of the side notch 7 in the inner race 2, the said notch 10 being placed during this pushing-in movement in the position shown in Figs. 5-7 relatively to the edges of the notch 7. It will be understood from Figs. 5-7 that on account of the notches 10 in the distance pieces 8 it is possible to push the distance pieces into place without the width of the side notch 7 having to be increased over its usual amount necessary for introducing the ball.

Figure 12:
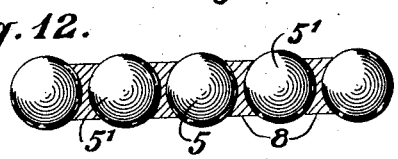

Figs. 8-12 illustrate the movement of the last ball 5 and of the two last distance pieces 8 relatively to one another when pushed into place. By applying pressure to the ball in the direction indicated by the arrows in Figs. 7 and 8, the two distance pieces 8 are caused to turn around said ball and around the two balls 5' on either side previously introduced into the tracks, so that after having originally occupied the relative positions shown in Fig. 8, the three members 5, 8 and 8 are gradually moved into the plane containing the balls and the distance pieces previously introduced, as shown in Fig. 12. The clearance between the members is simultaneously taken up so that the balls and the distance pieces come to bear tightly against one another, and no member being elastic, it will be obvious that the balls will be maintained at definite distances from one another by the distance pieces. The distance pieces 8 are capable of turning around their geometrical axes which intersect in the centres of the balls 5, so that by rotating the two distance pieces 8 provided with notches 10 less than one turn it is possible to prevent said distance pieces from moving out from the bearing.

Figure 15:

The embodiment of the distance pieces 8 illustrated in Figs. 13 to 15 inclusive differs from the distance piece shown in Figs 3 and 4 principally by its being made in the shape of a plate with corrugated edges, for saving material. The notch necessary for moving the distance piece into the bearing is in this instance made in the shape of a notch 11 in the edge of one of the folds.

There is of course nothing to prevent all distance pieces 8 from being provided with notches 10 or 11, but it is preferred only to provide such notches in the two distance pieces to be pushed into the bearing together with the last ball, the risk of any distance piece dropping out being thus materially decreased.

I claim:

1. In a ball bearing, the combination of races provided with notches forming together an entrance opening, balls between said races, and non-elastic distance pieces between said balls and having a larger extension in radial direction than the distance between the side edges of the races, two of said distance pieces being shaped in such manner that these distance pieces together with a ball placed between the same may be introduced into the bearing by said distance pieces bearing against and turning around two adjacent balls in the bearing without interfering with the edges of said entrance opening.

2. In a ball bearing, the combination of races provided with notches forming together an entrance opening, balls between said races, and non-elastic distance pieces between said balls and having a larger extension in radial direction than the distance between the side edges of the races, two of said distance pieces being provided with notches allowing said distance pieces with a ball placed between the same to be introduced through said entrance opening past its edges by said distance pieces bearing against and turning around two adjacent balls in the bearing.

JOHAN LINUS BORG.